United States Patent
Ramp

(10) Patent No.: US 10,375,890 B2
(45) Date of Patent: Aug. 13, 2019

(54) LEVEL CONTROL METHOD FOR AN AGRICULTURAL COMBINE

(71) Applicant: Deere & Company, Moline, IL (US)

(72) Inventor: Benjamin E. Ramp, Geneseo, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/797,358

(22) Filed: Oct. 30, 2017

(65) Prior Publication Data

US 2019/0124846 A1    May 2, 2019

(51) Int. Cl.
*A01D 75/00* (2006.01)
*A01D 75/28* (2006.01)
*A01D 41/127* (2006.01)

(52) U.S. Cl.
CPC ......... *A01D 75/285* (2013.01); *A01D 41/127* (2013.01); *A01D 75/282* (2013.01)

(58) Field of Classification Search
CPC .. A01D 41/127; A01D 75/285; A01D 75/282; A01D 75/287; B60G 9/02; B60G 21/007
USPC ............ 56/10.2 E, 15.5; 180/41; 280/6.154, 280/6.156; 460/8
See application file for complete search history.

(56) References Cited

U.S. PATENT DOCUMENTS

| | | | | |
|---|---|---|---|---|
| 3,065,590 A * | 11/1962 | Knollman | ............ | A01D 75/285 56/209 |
| 4,696,152 A * | 9/1987 | Kinzenbaw | .......... | A01D 75/285 180/41 |
| 4,750,751 A * | 6/1988 | Schafer | ................ | A01D 75/285 180/41 |
| 4,763,742 A * | 8/1988 | Langford | ............. | A01G 23/081 144/34.5 |
| 5,415,586 A * | 5/1995 | Hanson | ................ | A01D 75/287 180/41 |
| 7,748,203 B2 * | 7/2010 | Solbrack | ............. | A01D 75/285 280/6.154 |
| 7,832,740 B2 * | 11/2010 | Kim | ........................ | E02F 9/028 180/89.15 |
| 9,693,502 B2 * | 7/2017 | Gofron | .................. | A01B 73/00 |
| 9,844,184 B2 * | 12/2017 | Johnson | ............... | A01D 75/287 |
| 2007/0123326 A1 | 5/2007 | Mackin | | |

FOREIGN PATENT DOCUMENTS

EP    1862055    12/2007
WO   WO2015110373   7/2015

OTHER PUBLICATIONS

EP Search Report for 18202561.9-1006 dated Mar. 19, 2019.

* cited by examiner

Primary Examiner — Robert E Pezzuto
(74) Attorney, Agent, or Firm — Rathe Lindenbaum LLP

(57) ABSTRACT

A method of controlling an angular orientation of an agricultural combine having a chassis includes: determining a slope angle of the ground over which the combine is traveling; determining a tilt angle of the chassis; receiving an angle signal from an operator input device; combining the slope angle of the ground and the angle signal from the operator input device to calculate a desired angle of the chassis that is greater than horizontal (0°) and less than the slope angle of the ground.

17 Claims, 3 Drawing Sheets

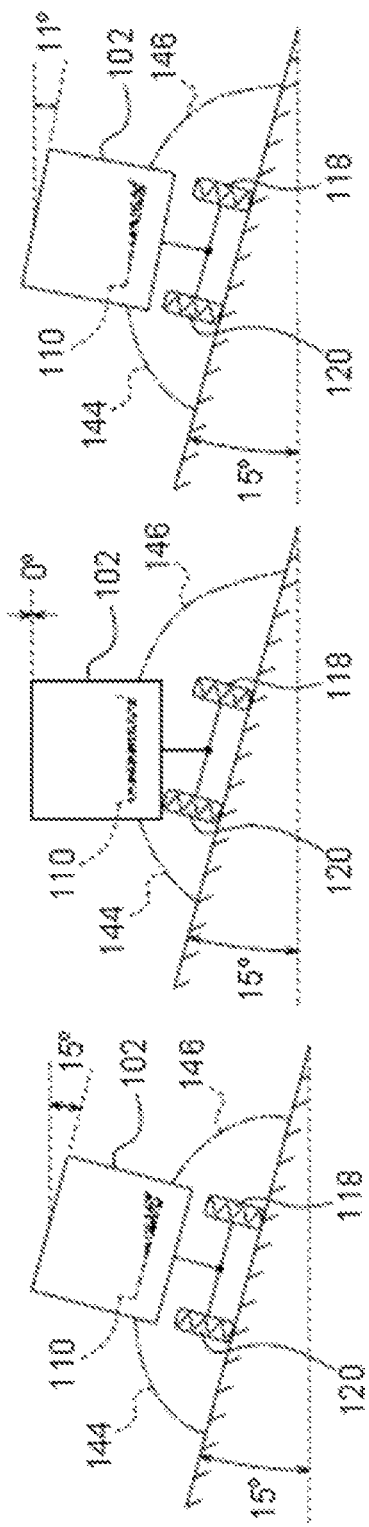

LEVEL CONTROL METHOD FOR AN AGRICULTURAL COMBINE

FIELD OF THE INVENTION

This invention relates to agricultural combines. In particular it relates to threshing, separating and cleaning mechanisms for agricultural combines. More particularly, it relates to tilting and leveling mechanisms.

BACKGROUND OF THE INVENTION

Agricultural harvesters such as combines, travel through fields of agricultural crop harvesting the crop.

The threshing, cleaning and separating mechanism inside the agricultural combine typically includes a rotor disposed inside a concave grating. Cut crop material is fed between the rotating rotor and the stationary grating to thresh and separate the crop.

The grain falls through holes in the grating and onto a sieve and/or chaffer in a cleaning shoe. Sieves and chaffers are generally planar sheets with holes in them through which air is blown. The air lifts the residue and carries it away to the end of the combine. The grain, being heavier, falls through the holes in the sieves and chaffers and is gathered in the bottom of the cleaning shoe to be conveyed to the top of the combine and deposited in a grain tank or grain reservoir.

Sieves and chaffers work best if the grain is evenly distributed across their width. When a combine travels on the side of a hill and the combine body tilts, the grain tends to accumulate on one side of the sieve/chaffer and the cleaning efficiency is reduced. For that reason, combines are provided with leveling mechanisms to level the sieve within the combine itself, or to level the whole combine by adjusting the relative height of the combine's wheels. To level the entire combine, leveling mechanisms are provided that lift or lower the front drive wheels, thereby tilting the combine body in a side-to-side direction until the sieves are horizontal. These combines are commonly called "side hill combines".

This whole-combine system of tilting the combine body with respect to the ground causes problems for the crop residue spreading mechanisms. Most combines have crop residue spreading mechanisms with adjustable fans, vanes and other steering devices. These mechanisms are fixed on the rear of the combine and spread the crop residue side to side behind the combine itself. The purpose of the residue spreading mechanisms is to redistribute the crop residue evenly over the ground where it can be broken down and returned to the soil as nutrients.

As long as the combine body is parallel to the surface of the ground (such as when traveling on flat ground) the residue can be evenly distributed. When the combine is not parallel to the surface of the ground (such as when traveling on the side of the hill with the combine body tilted) the residue distribution is irregular. Instead of throwing the residue evenly to both sides of the combine, crop residue spreading mechanisms throw the crop residue into ground on the uphill side of the combine, and throw the crop residue way downhill on the downhill side of the combine. Again, this is due to the fact that the combine body has been leveled while it is traveling on the side of a hill.

What is needed is a method for permitting the combine to travel off-level on the side of the hill in order to provide better crop residue distribution while not compromising cleaning shoe operation too much.

It is an object of this invention to provide such a method.

SUMMARY OF THE INVENTION

In accordance with a first aspect of the invention, a method of controlling a side-to-side angular orientation of and agricultural combine having a chassis comprises the steps of: electronically determining a slope angle of the ground over which the combine is traveling; electronically determining a tilt angle of the chassis; electronically receiving an angle signal from an operator input device; and electronically combining the slope angle of the ground and the angle signal from the operator input device to calculate a desired angle of the chassis that is greater than horizontal (0°) and less than the slope angle of the ground.

The combine may comprise two front drive wheels coupled to the chassis and at least one actuator coupled to at least one of the two front drive wheels, wherein the at least one actuator adjusts a position of the at least one front drive wheels with respect to the chassis, and the method may comprise the step of: electronically driving the at least one actuator to reposition the chassis to the desired angle.

The slope angle of the ground over which the combine is traveling May be a slope angle of the ground in a direction perpendicular to a direction of travel of the combine through the field harvesting crops.

The tilt angle of the chassis may be an angle of tilt of the chassis with respect to horizontal in a direction perpendicular to the direction of travel of the combine through the field harvesting crops.

BRIEF DESCRIPTION OF THE DRAWINGS

FIG. 3A illustrates an example of a traditional combine operating on the side of a hill.

FIG. 3B illustrates an example of a side hill combine operating on the side of a hill.

FIG. 3C illustrates an example of a side hill combine operating on the side of the hill in accordance with the present invention.

DETAILED DESCRIPTION OF THE PREFERRED EMBODIMENTS

Figure 1:
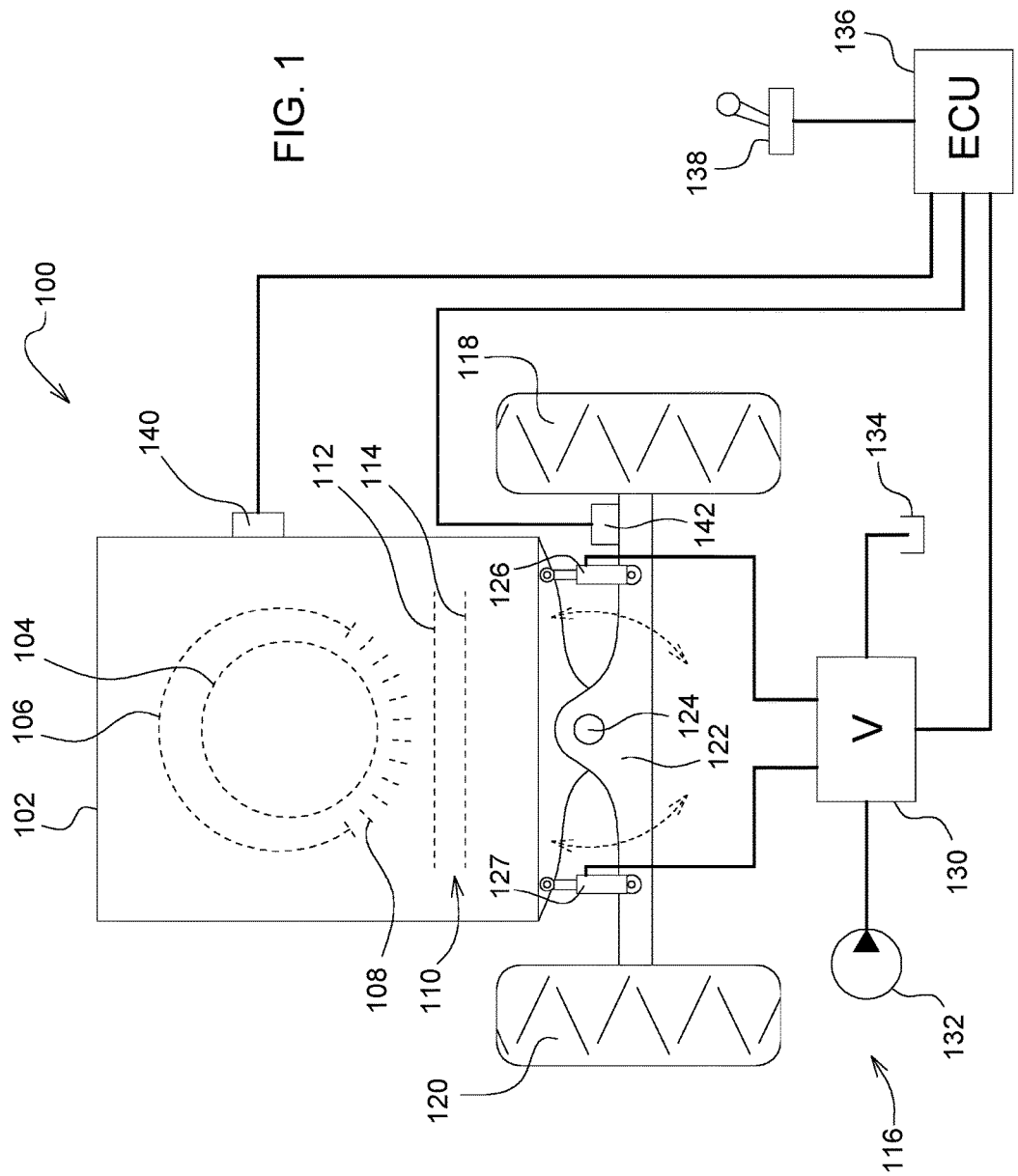
FIG. 1 is a front view of an agricultural combine and level control system.

In FIG. 1 an agricultural harvester 100 includes a chassis 102 in which a threshing and separating rotor 104 is located. The rotor 104 is positioned inside a cage 106 that retains the cut crop matter against the surface of the rotor 104 as the rotor 104 rotates.

The cage 106 includes a concave grating 108 that extends around the lower portion of the rotor 104. As the cut crop material is threshed and separated between the rotor 104 and the cage 106, grain falls through apertures in the concave grating 108. This grain collects in a cleaning shoe 110, which comprises a sieve and a chaffer 112, 114.

The agricultural harvester 100 is supported on a front suspension 116 and a rear suspension. The rear suspension has two wheels located on opposite ends of a pivoting axle. The front suspension 116 has a pivoting axle 122 on which a large left drive wheel 118 and a large right drive wheel 120 are mounted at opposing ends.

The pivoting axle 122 is pivotally coupled to the chassis 102 of the combine at a pivot joint 124. The pivot joint 124 permits the pivoting axle to freely pivot about a fore-and-aft extending axis. Two actuators include a left side actuator 126 and a right side actuator 127 that are coupled between the pivoting axle 122 and the chassis 102 of the combine.

The left side actuator 126 and the right side actuator 127 are hydraulic cylinders that are connected to a valve 130. The valve 130 is supplied with hydraulic fluid under pressure from a hydraulic fluid source 132. The valve 130 selectively applies this hydraulic fluid under pressure to the two actuators 126, 127 in order to pivot the pivoting axle 122 about the fore-and-aft extending axis, causing one actuator to extend as the other were actuator retracts, and vice versa. The valve 130 is coupled to a hydraulic reservoir or tank 134 which receives hydraulic fluid exhausted from the two actuators 126, 127 in this pivoting process.

The valve 130 is coupled to and is driven by an ECU 136. The ECU 136 signals the valve to indicate which actuator should be emptied, and which actuator should be filled in order to pivot the chassis 102 in an appropriate direction with respect to the drive wheels.

An operator input device 138 is coupled to the ECU 136 in order to control the operation of the ECU 136. This operator input device 136 can be a lever, knob, dial, touchscreen, voice recognition system, or other similar input device for inputting operator commands.

A first tilt sensor 140 is mounted to the combine chassis 102 to indicate the side to side angle of the chassis 102 with respect to the ground. The tilt sensor 140 transmits a signal to the ECU 136 indicating the side-to-side orientation of the chassis 102 with respect to the ground.

A second tilt sensor 142 is mounted to the pivoting axle 122 to indicate the side-to-side angle of the front axle 122 with respect to the ground. The tilt sensor 142 transmits a signal to the ECU 136 indicating a side orientation of the axle 122 with respect to the ground.

In a first mode of operation, the operator can signal the ECU 136 to control the angle of tilt of the combine chassis with respect to the ground. In this mode of operation, the ECU is programmed to repeatedly scan the first tilt sensor 140, and determine from the first tilt sensor signal whether and to what degree the chassis 102 (i.e. the body of the combine) is pivoted with respect to the ground about the longitudinal extending axis. The ECU 136 monitors whether the combine is level, is tilted to the left, or is tilted to the right, and by how much the combine is tilted.

In the first mode of operation, the ECU 136 controls the valve 130, which controls the actuators 126, 127 to keep the chassis 102 level. As the combine travels along the side of a hill, for example, and one wheel rises up because it is running over ground that is higher on the hillside, the ECU 136 will tilt the chassis 102 with respect to the two drive wheels to keep the chassis 102 level while the wheels are at different heights rolling across different, uneven terrain. This first mode of operation keeps the sieve and chaffer level and horizontal (in a side to side direction) and thus spreads the dirty grain falling from the grating 108 most evenly across the width of the sieve and chaffer.

As explained above, this mode of operation can cause crop residue being spread by the crop residue spreading mechanism to be spread unevenly—residue spread farther on the uphill side of the combine then on the downhill side of the combine.

Crop residue spread on the uphill side of the combine will travel only a short distance.

Crop residue spread on the downhill side of the combine will travel a longer distance. Thus, the crop will not be spread evenly to each side behind the combine. This uneven crop spreading is undesirable. It is preferred that the crop be spread evenly and equally to both sides of the combine.

For this reason, the ECU 136 is programmed to provide a second mode of operation that mitigates this effect by limiting the amount of automatic leveling that the ECU 136 would otherwise do in its first mode of operation.

In the second mode of operation, instead of pivoting the chassis 102 until it is completely level, the ECU 136 deliberately pivots the chassis 102 until it is close to level, but not completely level. The ECU 136 pivots the chassis 102 until it is disposed at an angle between horizontal (i.e. 0°) and the slope of the hill on which the combine is harvesting (i.e. 15°). In the example of FIG. 3C, this intermediate angle is 11°.

The effect of this is to raise the uphill side of the chassis 102 slightly higher that it would be in the first mode of operation (in which the chassis 102 is moved to a horizontal, level orientation) and lower the downhill side of the chassis 102 slightly lower than it would be in the first mode of operation, and thereby spread the residue more evenly across the rear of the combine, while permitting the sieve and chaffer to operate at a slightly more inefficient angle. In effect, the ECU 136 is programmed to compromise the leveling (i.e. the performance) of the sieve and chaffer somewhat, in order to improve the performance of the crop residue spreading mechanism.

The effect of this intermediate tilting in the second mode of operation is shown in FIG. 3C.

In the example of FIG. 3A, the chassis of a regular combine (one with a fixed axle and no ability to tilt side-to-side), is tilted 15° when it travels on the side of a hill that has a slope of 15°. As a result, the grain accumulating on the sieves and chaffers of the cleaning shoe 110 is heaped on to one side. The sieve operates extremely poorly. This heaping is the reason that side hill combines were invented: to level the combine cleaning shoe in a side-to-side direction and improve sieve performance when traveling on the side of a hill. Note, however, that the residue 144, 146 thrown out of the combine is evenly distributed on both sides of the combine.

FIG. 3B illustrates a typical side hill combine (i.e. a combine in which the relative height of the front drive wheels 118, 120 can be adjusted relative to the chassis 102). In this arrangement, the combine senses whether the chassis 102 is level, and adjusts actuators to tilt the chassis 102 and make it level and horizontal. In FIG. 3B, the slope of the hill is 15°, but the control system has corrected the angle of tilt of the chassis 102 to be 0°: perfectly level. The typical side hill combine tilts the chassis with respect to the ground 15°, an angle equal to the slope angle of the ground over which the combine is traveling. In FIG. 3B, the cleaning shoe 110 operates very well since the grain is evenly distributed across the width of the sieves and chaffers of the cleaning shoe 110. However, the residue thrown from the rear of the combine is spread very unevenly. The residue 146 thrown downhill travels much farther than the residue 144 thrown uphill.

FIG. 3C illustrates an example of the operation of the combine in accordance with the second mode of operation. In FIG. 3C, the chassis 102 is not at the same angle as the ground (FIG. 3A), nor is it horizontal (FIG. 3B). It is at an angle between the slope of the ground (15°) and level and horizontal (0°). This exemplary angle is 11° in FIG. 3C.

In FIG. 3C, grain in the cleaning shoe 110 is not level as it is in FIG. 3B, which is most preferred. On the other hand, the grain in the cleaning shoe 110 is not piled on one side as it is in FIG. 3A, which is least preferred. Similarly in FIG.

3C, the distribution of residue 144, 146 is not evenly distributed side-to-side as it is in FIG. 3A, which is most preferred. On the other hand, the residue distribution is not extremely one-sided as it is in FIG. 3B, which is least preferred.

The second mode of operation (FIG. 3C), permits the operator to trade off the combine's cleaning shoe 110 performance with its residue distribution performance. It does this by tilting the chassis 102 of the combine to an operator-selectable angle between horizontal (0°) and the slope angle of the hillside (indicated by tilt sensor 142).

Figure 2:
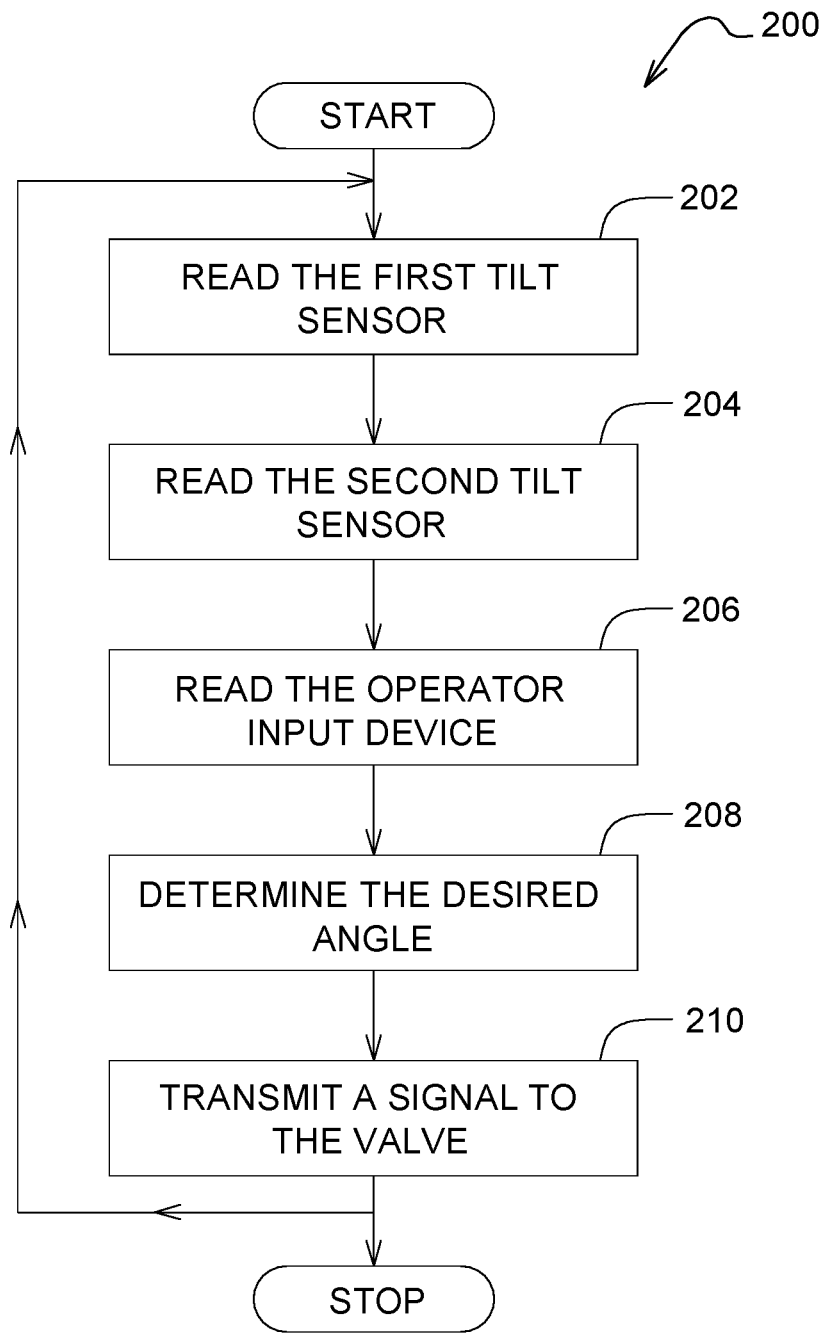
FIG. 2 is a flowchart of a second mode of operation of the level control system of FIG. 1.

FIG. 2 illustrates one way in which this second mode of operation is implemented by the ECU 136.

In step 200 the process starts.

In step 202 the ECU 136 reads the first tilt sensor 140 and determines the angle of the chassis 102.

In step 204, the ECU 136 reads the second tilt sensor 142 and determines the slope of the side hill on which the combine is harvesting.

In step 206, the ECU 136 reads the signal from the operator input device 138 to determine an offset angle of tilt desired by the operator.

In step 208, the ECU 136 determines the desired angle of the chassis 102. This desired angle the chassis equals the slope angle of the hill (indicated by the second tilt sensor 142) minus the offset angle of tilt (indicated by the operator input device 138).

In step 210, the ECU 136 transmits a signal to the valve 132 adjusts the actuators 126, 127. The signal that ECU 136 applies to the valve 132 is calculated by the ECU 136 to drive the chassis 102 to the desired angle. This may be implemented by a feedback control loop implemented by the ECU 136, such as a PID control loop. In this PID control loop, the input error signal can be the difference between the actual angle of the chassis 102 (indicated by tilt sensor 140), and the desired angle of the chassis 102 (the value calculated in step 208).

While the combine is traveling through the field harvesting crops, the slope angle of the ground (indicated by tilt sensor 142) will change continuously. The angle of the chassis 102 with respect to the ground (indicated by tilt sensor 140) will also change. Likewise, the operator may at any time adjust the operator input device 138 to select a new offset angle of tilt. Since these three inputs may continually change, the steps shown in FIG. 2 are automatically and periodically repeated to adjust the position of the actuators 126, 127. The steps are preferably repeated at a regular interval. The regular interval is preferably at least once every second. The regular interval is more preferably at least once every 250 ms. The regular interval is even more preferably at least once every 50 ms. The regular interval is even more preferably at least once every 10 ms.

ECU 136 can be a single digital microcontroller (with associated RAM and ROM) that is programmed to provide the modes of operation described herein. Alternatively, ECU 136 can be several digital microcontrollers connected over a serial or parallel network, each providing a portion of the functions described herein.

The actuators 126, 127 may be hydraulic, pneumatic, or electric actuators. They may be rotary actuators or linear actuators. They may be connected directly to the chassis 102 and the pivoting axle 122 as shown. Alternatively, they may be connected to mechanical links that are themselves connected to the chassis 102 and the pivoting axle 122.

A pivoting axle 122 is illustrated to which both the drive wheels 118, 120 are connected. Alternatively, each wheel may be independently coupled to the chassis 102, and each drive wheel may be provided with its own independent actuator to independently control the height of each wheel with respect to the chassis 102. For example, each drive wheel may be supported on one or more links that independently pivot with respect to the chassis 102.

Two actuators 126, 127 are described and illustrated herein for adjusting the position of the pivoting axle 122. Alternatively, a single actuator 126 or 127 could be used.

The claims below define the invention. The description and figures above are provided to enable one skilled in the art to make and use the invention. Other ways of making and using the invention will be apparent to those skilled in the art.

The invention claimed is:

1. A method of controlling an angular orientation of an agricultural combine having a chassis, comprising the steps of:
   electronically determining a slope angle of the ground over which the combine is traveling;
   electronically determining a tilt angle of the chassis;
   electronically receiving an angle signal from an operator input device;
   electronically combining the slope angle of the ground and the angle signal from the operator input device to calculate a desired angle of the chassis that is greater than horizontal (0°) and less than the slope angle of the ground.

2. The method of controlling of claim 1, where in the combine comprises two front drive wheels coupled to the chassis and at least one actuator coupled to at least one of the two front drive wheels, wherein the at least one actuator adjusts a position of the at least one of the two front front drive wheels with respect to the chassis, and the method comprises the step of:
   electronically driving the at least one actuator to reposition the chassis to the desired angle.

3. The method of controlling of claim 1, wherein the slope angle of the ground over which the combine is traveling is a slope angle of the ground in a direction perpendicular to a direction of travel of the combine through a field harvesting crops.

4. The method of controlling of claim 3, wherein the tilt angle of the chassis is an angle of tilt of the chassis with respect to horizontal in a direction perpendicular to the direction of travel of the combine through the field harvesting crops.

5. The method of controlling of claim 1, wherein the operator input device is selected from a group of operator input devices consisting of a lever, knob, dial, touchscreen, and voice recognition system.

6. The method of controlling of claim 1, wherein the desired angle is calculated by subtracting the offset angle of tilt from the slope angle of the ground.

7. The method of controlling of claim 1 further comprising executing a plurality of feedback control loops, and wherein each loop comprises:
   determining an actual angle of the chassis based upon signals from the at least one sensor;
   determining a difference between the actual angle of the chassis and the desired angle of the chassis; and
   outputs control signals to at least one actuator based upon the difference to reposition the chassis to the desired angle.

8. The method of controlling of claim 7, wherein the plurality of feedback control loops are executed at a frequency of a feedback control loop being executed at least once every second.

9. An agricultural harvester comprising:
a chassis comprising a threshing and separating rotor and a cleaning shoe;
a front suspension supporting the chassis above a terrain;
at least one actuator coupled between the chassis in the front suspension to tilt the chassis relative to the front suspension;
at least one sensor;
an electronic control unit to:
   determine a slope angle of ground over which the harvester is traveling and a tilt angle of the chassis based upon signals from the at least one sensor,
   to receive an offset angle of tilt value from the operator input device,
   to calculate a desired angle of the chassis that is greater than horizontal and less than the slope angle of the ground based upon a combination of the determined slope angle of ground, the tilt angle of the chassis and the received offset angle of tilt value received from the operator input device; and
   output control signals to the at least one actuator to reposition the chassis to the desired angle.

10. The agricultural harvester of claim 9, wherein the operator input device is selected from a group of operator input devices consisting of a lever, knob, dial, touchscreen, and voice recognition system.

11. The agricultural harvester of claim 9, wherein the electronic control unit is to calculate the desired angle by subtracting the offset angle of tilt from the slope angle of the ground.

12. The agricultural harvester of claim 9, wherein the electronic control unit is to execute a plurality of feedback control loops, and wherein the electronic control unit, during each loop:
   determines an actual angle of the chassis based upon signals from the at least one sensor;
   determines a difference between the actual angle of the chassis and the desired angle of the chassis; and
   outputs control signals to the lease one actuator based upon the difference.

13. The agricultural harvester of claim 12, wherein the plurality of feedback control loops are executed at a frequency of a feedback control loop being executed at least once every second.

14. A non-transitory computer-readable medium containing instructions to direct a microcontroller to:
   electronically determining a slope angle of the ground over which the combine is traveling;
   electronically determining a tilt angle of the chassis;
   electronically receiving an angle signal from an operator input device;
   electronically combining the slope angle of the ground and the angle signal from the operator input device to calculate a desired angle of the chassis that is greater than horizontal (0°) and less than the slope angle of the ground; and
   electronically drive at least one actuator to reposition the chassis to the desired angle.

15. The medium of claim 14, wherein instructions are to direct the microcontroller to calculate the desired angle by subtracting the offset angle of tilt from the slope angle of the ground.

16. The medium of claim 14, wherein the instructions are direct the microcontroller to execute a plurality of feedback control loops, and wherein microcontroller, during each loop:
   determines an actual angle of the chassis based upon signals from the at least one sensor;
   determines a difference between the actual angle of the chassis and the desired angle of the chassis; and
   outputs control signals to the lease one actuator based upon the difference.

17. The medium of claim 16, wherein the plurality of feedback control loops are executed at a frequency of a feedback control loop being executed at least once every second.

* * * * *